United States Patent [19]
Padgett

[11] Patent Number: 5,577,202
[45] Date of Patent: Nov. 19, 1996

[54] MESSAGE HANDLING SYSTEM FOR AUTOMATED GATEWAY BETWEEN FIRST AND SECOND HANDLING SYSTEMS WHEREIN FIRST ENVELOPE IS ADDED TO A SECOND ENVELOPE RESPECTIVELY WITHOUT CHANGING TEXT

[75] Inventor: Robert D. Padgett, Burke, Va.

[73] Assignee: TRW Inc., Redondo Beach, Calif.

[21] Appl. No.: 934,602

[22] Filed: Aug. 24, 1992

[51] Int. Cl.$^6$ .................................................. H01J 13/00
[52] U.S. Cl. ........................... 395/200.18; 395/200.17; 364/241.7; 364/240.8; 364/242.94; 364/DIG. 1
[58] Field of Search .................................... 395/600, 275, 395/200, 200.02, 200.16, 200.17, 200.18; 364/287, 604, 260.9, 840, 284.3; 379/219, 220, 229, 231

[56] References Cited

U.S. PATENT DOCUMENTS

| | | | |
|---|---|---|---|
| 4,075,691 | 2/1978 | Davis et al. | 395/275 |
| 4,079,452 | 3/1978 | Larson et al. | 395/200.02 |
| 4,390,981 | 6/1983 | Wood et al. | 370/56 |
| 4,837,798 | 6/1989 | Cohen et al. | 379/88 |
| 5,051,720 | 9/1991 | Kittirutsunetorn | 340/310 R |
| 5,133,053 | 7/1992 | Johnson et al. | 395/200 |
| 5,187,787 | 2/1993 | Skeen et al. | 395/600 |
| 5,202,977 | 4/1993 | Pasetes, Jr. et al. | 395/500 |
| 5,204,897 | 4/1993 | Wyman | 380/4 |
| 5,377,191 | 12/1994 | Farrell et al. | 370/94.1 |

*Primary Examiner*—Thomas C. Lee
*Assistant Examiner*—Sang Hui Kim
*Attorney, Agent, or Firm*—G. Gregory Schivley; Robert W. Keller

[57] ABSTRACT

An automated gateway system for interfacing a first message handling system with a second message handling system. In the preferred embodiment, the automated gateway of the present invention allows the exchange between a formal system such as the United States Department of Defense AUTODIN message handling system and an informal system such as the International Standards Organization X.400 message handling system. Messages received from a first one of the message handling systems are processed and sent to a message routing unit which determines if the message should be sent to the first or second message handling system. If the second message handling system address exists, an automated gateway user agent validates the address and creates a second message handling system envelope around the entire message and submits it to the second message handling system.

25 Claims, 10 Drawing Sheets

FIGURE 5

| HASH DEFINED VALUE | POINTER TO STRUCTURE AND DESCRIPTION |
|---|---|
| P3P7_ORIG_INV_ERROR | No structure pointed to<br>Originator is invalid. |
| P3P7_EOS_NOT_SUBSCR_ERR | No structure pointed to<br>One of the operations requested was not provided as the MTS does not subscribe to that Element of Service. |
| P3P7_RECIP_IMPROP_SPEC_ERR | COMMONRecipImpropSpecError<br>One or more of the recipients were improperly specified. |
| P3P7_MSG_SUBMISS_ID_INV_ERR | No Structure pointed to<br>A deferred delivery cancellation request failed as the Message Id was invalid. |
| P3P7_DEF_DLV_CNCL_REJ_ERR | No Structure pointed to<br>A D.D. cancellation failed because either proof of submission was given to the originator or the message had already been processed. |
| P3P7_INCON_REQ_ERR | No Structure pointed to<br>An inconsistent request was made. |
| P3P7_RMT_BND_ERR | No Structure pointed to<br>The MS is unable to bind to the MTS. |
| P3P7_SUBMISS_CNTL_VIOL_ERR | No Structure pointed to<br>An operation was attempted that would have violated the controls imposed by the MTS. |
| P3P7_SEC_ERR | COMMONSecError<br>A requested operation would have violated the security policy. |
| P3P7_UNSUPP_CRIT_FUNC_ERR | No Structure pointed to<br>An argument of the abstract operation was marked as critical but is unsupported. |

FIGURE 6

| HASH DEFINED VALUE | POINTER TO STRUCTURE AND DESCRIPTION |
|---|---|
| P7_ATTR_ERR | P7AttribError<br>An attribute related error occurred. |
| P7_DELETE_ERR | P7DeleteError<br>An error occurred deleting an entry. |
| P7_FETCH_RESTRIC_ERR | P7FetchRestrictionError<br>An attempt was made to violate a restriction associated with fetching. |
| P7_RANGE_ERR | P7RangeError<br>The selector's range field was invalid in an abstract operation. |
| P7_SEQNUM_ERR | P7SeqNumberError<br>The specified sequence number does not exist. |
| P7_INV_PARAMS_ERR | No Structure pointed to<br>The received parameters had semantic problems. |
| P7_SERVICE_ERR | P7ServiceError<br>The MS had a problem providing a service. |
| P7_SEC_ERR | COMMONSecError<br>See MSSE table. |

FIGURE 7

| HASH DEFINED VALUES (class) | C Structures (ptr) |
|---|---|
| MH_ATTR_CHILD_SEQ_NUMBER | P7SeqNumber* |
| MH_ATTR_CONTENT | P2InfoObject* |
| MH_ATTR_CONTENT_TYPE | struct objidv* |
| MH_ATTR_CREATION_TIME | struct atime* |
| MH_ATTR_ENTRY_STATUS | Sint32* |
| MH_ATTR_ENTRY_TYPE | Sint32* |
| MH_ATTR_MSG_DELIV_ENVELOPE | P3MsgDelivEnv* |
| MH_ATTR_originator_name | COMMONORName* |
| MH_ATTR_PARENT_SEQ_NUMBER | Sint32* |
| MH_ATTR_PER_RECIP_REP_DEL_FIELDS | P3PerRecipReportDelivFields* |
| MH_ATTR_REPORT_DELIVERY_ENVELOPE | P3ReportDelivEnv* |
| MH_ATTR_SEQUENCE_NUMBER | P7SeqNumber* |
| MH_ATTR_SUBJ_SUBMISS_ID | COMMONMtSId* |
| MH_ATTR_SUBJ_IPM | COMMONMTSId* |
| MH_ATTR_THIS_IPM | COMMONMTSId* |
| MH_ATTR_INTENDED_RECIP_NAME | COMMONORName* |
| MH_ATTR_REDIRECTION_HISTORY | COMMONRedirectionHistory* |

FIGURE 8

| BODY PARTS | VALUE |
|---|---|
| IA5 Text | Body_Part_ia5_text |
| Bilaterally Defined | BodyPart_bilatly_defined |

FIGURE 9

RO-General Problem Rejects.

| type + RorjDpdu_GeneralProb | | |
|---|---|---|
| problem's value | val | Description |
| GENERALPROB_unrecogAPDU | 0 | Unrecognised APDU |
| GENERALPROB_mistypAPDU | 1 | APDU does not conform to X.229 |
| GENERALPROB_badlystructAPDU | 2 | APDU does not conform to X.208/X.209 |

FIGURE 10

RO-Invoke Problem Rejects.

| type = RorjDpdu_InvokeProb | | |
|---|---|---|
| problem's value | val | Description |
| INVOKEPROB_dupInvocation | 0 | Duplicate Invoke Id received |
| INVOKEPROB_unrecogOperation | 1 | Unrecognised operation received |
| INVOKEPROB_mistypeArg | 2 | Argument received not of agreed type |
| INVOKEPROB_resLimit | 3 | Resource limit exceeded |
| INVOKEPROB_initReleasing | 4 | Request refused - Initiator releasing. |
| INVOKEPROB_unrecogLinkedID | 5 | Invoke Id equal to Linked Id not found |
| INVOKEPROB_linkedRespUnexp | 6 | Invoked operation referred to by linked operation is not a parent |
| INVOKEPROB_unexpChildOp | 7 | Unexpected child operation |

FIGURE 11

RO-Returned Result Problems

| type = RorjDpdu_ReturnResProb | | |
|---|---|---|
| problem's value | val | Description |
| RETURNRESPROB_unrecogInv | 0 | No operation with that invoke Id is in progress. |
| RETURNRESPROB_resRespUnexp | 1 | Invoked operation does not report a result. |
| RETURNRESPROB_mistypedRes | 2 | Type of result is not agreed between ROSE users. |

FIGURE 12

RO-Returned Error Problems

| type = RorjDpdu_ReturnErrProb | | |
|---|---|---|
| problem's value | val | Description |
| RETURNERRPROB_unrecogInv | 0 | No operation with that invoke Id is in progress. |
| RETURNERRPROB_errRespUnexp | 1 | Invoked Operation does not report a result. |
| RETURNERRPROB_unrecogErr | 2 | Received Error is not agreed between ROSE users. |
| RETURNERRPROB_unexpError | 3 | Received error should not be produced by the invoked operation. |
| RETURNERRPROB_mistypedPar | 4 | Error parameter received is not agreed between ROSE users. |

MESSAGE HANDLING SYSTEM FOR AUTOMATED GATEWAY BETWEEN FIRST AND SECOND HANDLING SYSTEMS WHEREIN FIRST ENVELOPE IS ADDED TO A SECOND ENVELOPE RESPECTIVELY WITHOUT CHANGING TEXT

BACKGROUND OF THE INVENTION

1. Technical Field

The present invention relates to message handling systems and more particularly to a technique for interfacing two different message handling systems.

2. Discussion

The electronic transfer of message data is an increasingly important means of communication. It has many advantages over conventional methods such as mail and the telephone. As a result, a number of message handling systems have been developed to meet the needs of electronic message transfer for various categories of users. For example, one message handling system used in the United States is known as E-mail. An international message handling system, commonly used in Europe, is known as the International Standards Organization (ISO) Advanced Communications System (ADCOMMS) X.400 message handling system. Both of these systems are considered informal systems since neither is accepted as a formal system for record communications in accordance with United States Government message standards.

In contrast, formal message handling systems include those systems approved as "record communication" systems by the United States Government. One formal message handling system developed by the U.S. Department of Defense is referred to as the AUTODIN network. This is a system for implementing record communications by providing for end-to-end accountability of all messages. That is, a record is kept of every point a message goes into the system so that no message in the system is ever lost. Various types of standards exist for Department of Defense AUTODIN messages including those commonly known as Allied Communications Publication (ACP) 127; JANAP 128; and DOI-103. These standards set up criteria for the format of the message including the format of the header of the message, the body of the message and the end of the message, as well as the contents, the routing information on the header format, the operator signals, the precedence of the message and classification of the message.

One limitation of message handling systems is that they are generally self-contained systems so that messages cannot cross over from one system into the other. Some systems for interfacing two different message handling systems, known as "gateways" have been developed. However, their use has been primarily restricted to interfacing informal systems with each other, and have not been usable for interfacing two formal systems, or a formal and an informal system. In general, this is because the strict requirements of the formal systems have been heretofore considered substantially incompatible with the informal system messages.

Thus, it would be desirable to provide a means for interfacing two different message handling systems. It would also be desirable to provide a system for providing an interface between formal and informal message handling systems or between two different formal message handling systems which preserves the integrity of the message while satisfying the constraints of the respective message handling systems.

SUMMARY OF THE INVENTION

Pursuant to the present invention, an automated gateway for interfacing a first message handling system with a second message handling system is provided. The system includes input units for receiving messages from both the first and second message handling systems. A message routing module determines if messages received from the second message handling system should be sent to an address in the first or second message handling system. The message routing module includes a means for storing a table of addresses existing in the first message handling system and a means for determining if the received message contains one of the first message handling system addresses. In addition, the message routing module includes a unit for creating a first message handling system envelope around a message received from the second message handling system if it contains a first message handling system address. The system also includes a means for transferring the message with this envelope to the first message handling system.

In accordance with a preferred embodiment of the present invention the message routing module also includes a unit for routing messages received from the second message handling system back to the second message handling system if a received message does not contain a first message handling system address.

In accordance with an additional embodiment, the system includes a unit for determining if a message received from the first message handling system contains an address in the first message handling system and if so, for directing the message back to the first message handling system. For messages received by the system from the first message handling system which contain an address in the second message handling system, the system includes a unit for routing this message to the second message handling system. In this way, the automatic gateway user agent of the present invention provides an automated way of recognizing when messages need to be transferred from one message handling system to the other and for automatically reconfiguring the messages to be compatible with the other system.

BRIEF DESCRIPTION OF THE DRAWINGS

The various advantages of the present invention will become apparent to one skilled in the art by reading the following specification and by reference to the following drawings in which:

FIG. 5 is a table of message submission service element abstract errors;

FIG. 6 is a table of message retrieval service element abstract errors;

FIG. 7 is a table of attribute support functions;

FIG. 8 is a table of supported body parts and their associated values;

FIG. 9 is a table of general problem rejects;

FIG. 10 is a table of invoke problem rejects;

FIG. 11 is a table of returned result problems; and

FIG. 12 is a table of returned error problems.

DESCRIPTION OF THE PREFERRED EMBODIMENTS

Figure 1:
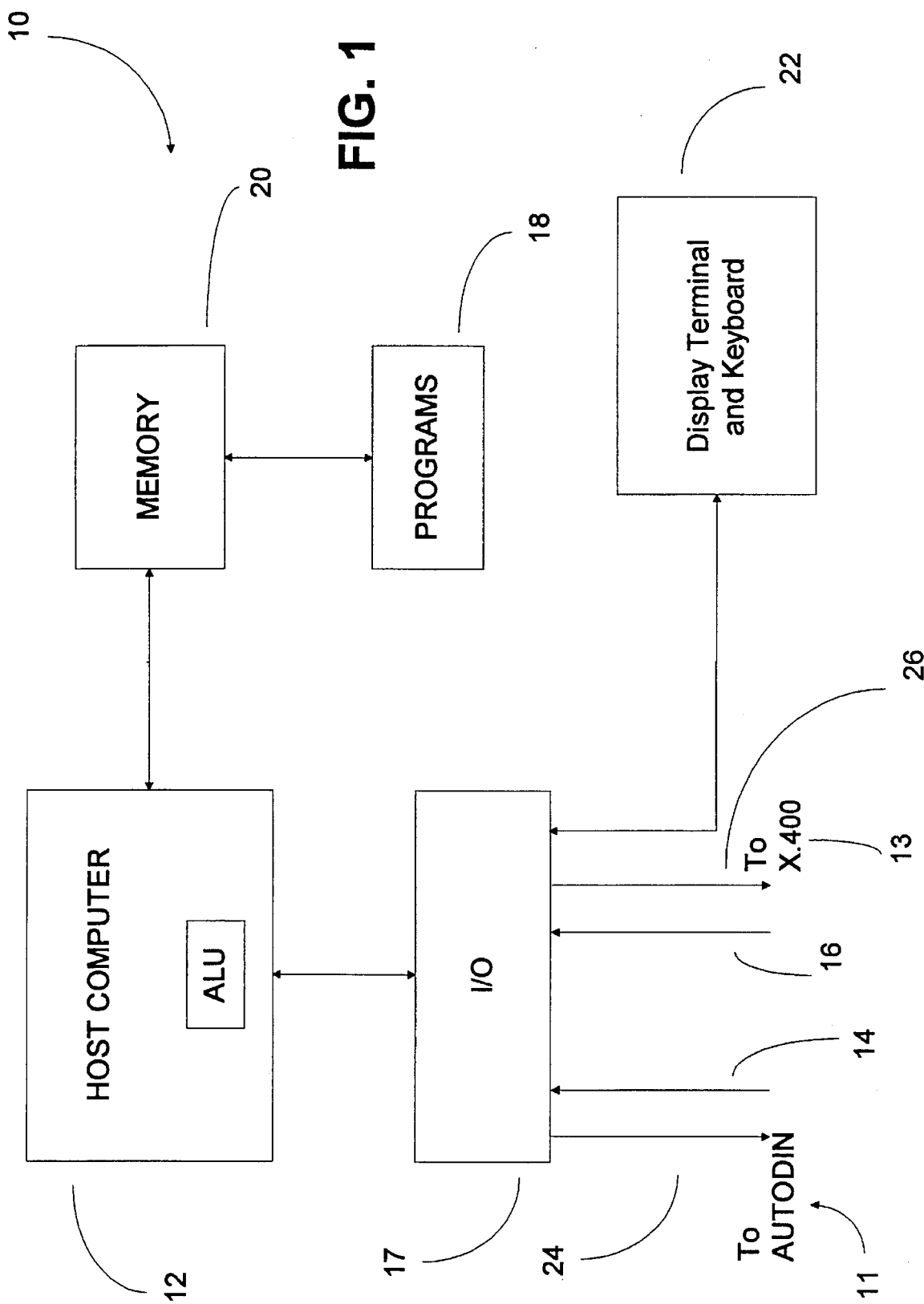
FIG. 1 is a block diagram of the main components of the present invention.

Referring to FIG. 1, a message routing system 10 in accordance with the present invention is shown. The message routing system 10 uses as a hardware platform a host computer 12 which may comprise, for example, a conventional personal computer.

The message routing system 10 receives digital messages from a first message handling system 11 at a first input 14, and from a second message handling system 13 at a second input 16.

These messages are received by an input/output unit 17 and processed in the host computer 12 using a set of message routing programs 18 stored in its memory 20. The message routing programs 18 determine the type of message coming in, and the destination. If the message must cross over from one message handling system to another, these programs automatically perform any required conversion of the message into the proper format for transmission in the other message handling system. Messages are then output to the AUTODIN system on line 24 or to the X.400 system on line 26 depending on whether it is being routed to the first or second message handling system.

The system also includes a display terminal and keyboard 22 to permit manual message creating, editing and routing as described in more detail below.

Figure 2:
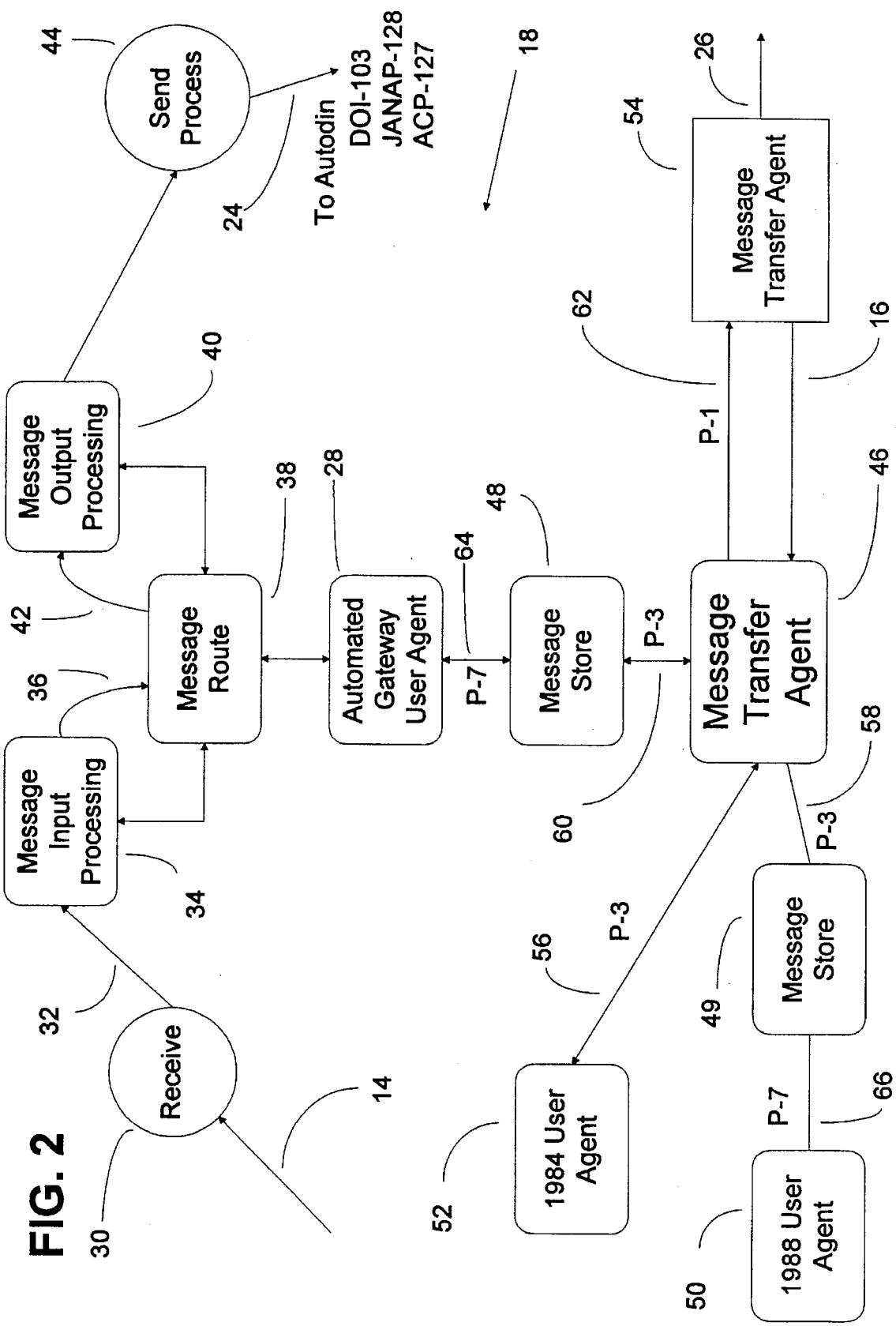
FIG. 2 is a functional diagram of a message routing system for interfacing two message handling systems in accordance with a preferred embodiment of the present invention.

Referring now to FIG. 2, the primary functional elements of the programs 18 used in the message routing system 10 in accordance with the present invention are shown. An automated gateway user agent (AGUA) 28 (discussed below) provides for the exchange of messages between two dissimilar message handling systems. In the preferred embodiment shown in FIG. 2, these two message handling systems comprise the U.S. Department of Defense AUTODIN network and the International Standards Organization (ISO) X.400 message handling systems. While the techniques of the present invention are illustrated in the preferred embodiment in conjunction with these two message handling systems, it will be appreciated that these techniques may be applied to other message handling systems as well. In the preferred embodiment, the present invention is suitable for interfacing a formal message handling system such as the AUTODIN system with an informal system such as the X.400 system.

As discussed above, the AUTODIN system is a formal record communication system with strict requirements for the handling and content of the messages. It is also utilized for message traffic of messages consisting exclusively of data. In contrast, the informal X.400 system is utilized for the free form exchange of data including maps, data and voice packets that have been digitized.

As shown in FIG. 2, an AUTODIN message enters the message routing system 10 along input line 14 and is directed to receive module 30. As discussed above, the AUTODIN message may be in either of the DOI-103, JANAP-128 or ACP-127 formats. The receive module 30 performs the handshaking protocol in accordance with AUTODIN Mode I operation. The receive module 30 process collects the entire formatted, ACP-127, JANAP-128 or DOI-103, message and then records the message. Once processed by the receive module 30, the message is sent along path 32 to a message input processing module 34. The message input processing module 34 provides security validation, message routing and logging functions. Also, if the message coming in contains both AUTODIN and X.400 messages, the message input processing module 34 will replicate the message and transfer the multiple versions to the message route unit 38 which will transfer each message to the appropriate addresses as described below.

Following the message input processing module 34, the message is sent along path 36 to the message route unit 38 which determines if the message should be sent to another AUTODIN user or to an X.400 user. This is accomplished by looking up the plain language addresses in the DOD message and comparing against the X.400 internal routing tables. These tables are stored in the message route unit 38. In essence, the message route unit determines if one of the plain language addresses corresponds to an X.400 address. It should be noted that the incoming messages can have as many as 500 addresses. If at least one X.400 address exists the message is sent to the automated gateway user agent (AGUA) 28. It will be appreciated by those familiar with the AUTODIN system that plain language addresses include address indicating groups (AIG), DOD address groups (DAG), and subject indicator codes (SIC).

The AGUA 28 will validate the address (confirm that it is a valid address), create an X.400 envelope around the entire message and submit the message to the X.400 message store unit 26. Further details of the AGUA will be described in connection with FIG. 3. The X.400 envelope consists of such things as surnames, operational recipient (OR) names, administrative domain, private management domain, etc. That is, the envelope contains the attribute information that is required to deliver a message through an X.400 system. The purpose of the X.400 envelope is to satisfy the requirements of the specifications that cover the format and the certification of the overall AUTODIN system by various Departments of Defense agencies. These specifications require that when messages are converted into another format, the integrity of the existing format must be protected. Thus, in the conversion from AUTODIN to X.400 the recipient of the message must receive the message in its entirety so the entire message is contained inside an X.400 message but is untouched inside the envelope.

On the other hand, if the message route module 38 determines that there is not an X.400 address contained in the message received along line 30, the message route module 38 will simply pass the message back into the AUTODIN data stream. In particular, message route module 38 will transmit the message to message output processing 40 along path 42 which will perform the final message validation, logging and output queue placement. Next, a send process module 44 will perform the line security and message security check. Also, the send process module 44, which is connected to the AUTODIN network, performs all protocol functions with the network.

When the message route module 38 determines that the message contains an X.400 address, it transfers the message to a format validation function (not shown) which is part of the message route module 38. The message then is reformatted to the X.400 format in the AGUA 28. That is, the message goes through a format conversion from whatever format it is in (ACP 127, JANAP 128 or DOI-103); is converted into the X.400 format (by creating the above-described envelope); the appropriate security markings are put on it; and it is passed through the X.400 system to a message transfer agent 46. It is then transferred either to a message store 48, and then to a 1988 user agent 50, or directly to a 1984 user agent 52, or alternatively to a remote message transfer agent 54.

In a similar but reverse manner, X.400 messages are received from either user agents 50, 52 or remote message transfer agents 54. Message transfer agent 46 determines if there is an AUTODIN address or not. It does this by checking address tables located in the message transfer agent 46 (similar to the address tables in message route module 38). For X.400 addresses the message is transmitted either to the user agents 50 and 52 or to other message transfer agents 54. Where the message transfer agent 46 determines that one of the addresses in the multiple address message is required to go to an AUTODIN address, the message is transferred through message store 48 and into the automated gateway user agent 28 where it is automatically put into the correct AUTODIN format. This is done by creating an AUTODIN envelope around the message. The message is then transferred to message output processing 40 and to the correct AUTODIN location through the send process module 44.

The transfer of information to and from the message transfer agent 46 along lines 56, 58, 60 and 62 must conform to an international criteria. Specifically, an ISO protocol set determines how data is passed between message transfer agents and message store units in the X.400 system. This international criteria specifies that transfer between message transfer agent 46 and message store units 48 and 49 occurs under the P3 protocol as shown in FIG. 2. Likewise, messages between message transfer agents 54 comply with the P1 protocol. Also, transfers between message store 48 and 49 and user agents 28 and 50 conform to the P7 protocol as shown on lines 64 and 66.

A message being routed by the message transfer agent 46 will be sent either to another message transfer agent such as 54, message store 48 or a user agent such as 52. The message transfer agent 46 determines which of these destinations to send it based on operational recipient (OR) rings in the message which signify the address of the recipient. The message transfer agent 46 upon receiving a message will determine to whom the message should be sent and consults with its tables to determine the right path. Initially the message transfer agent 46 will determine if the user is existent or is connected to that same message transfer agent 46. If it is a 1984 user agent 52 (under the 1984 standard), the message transfer agent 34 will either send the message or hold the message and send an alert directly to the user agent 52 (under the P3 protocol). If the message originates from a directly connected user agent under the 1988 protocol (such as user agent 50), the message transfer agent 46 will deposit the message in a local message store 49 connected to the message transfer agent 46. Alternatively, if the addressee is not in the message transfer agent 46 routing table it will transfer the message to the next connected message transfer agent 54 which will determine if the addressee is there and attempt to find the correct path to send it through.

Figure 3:
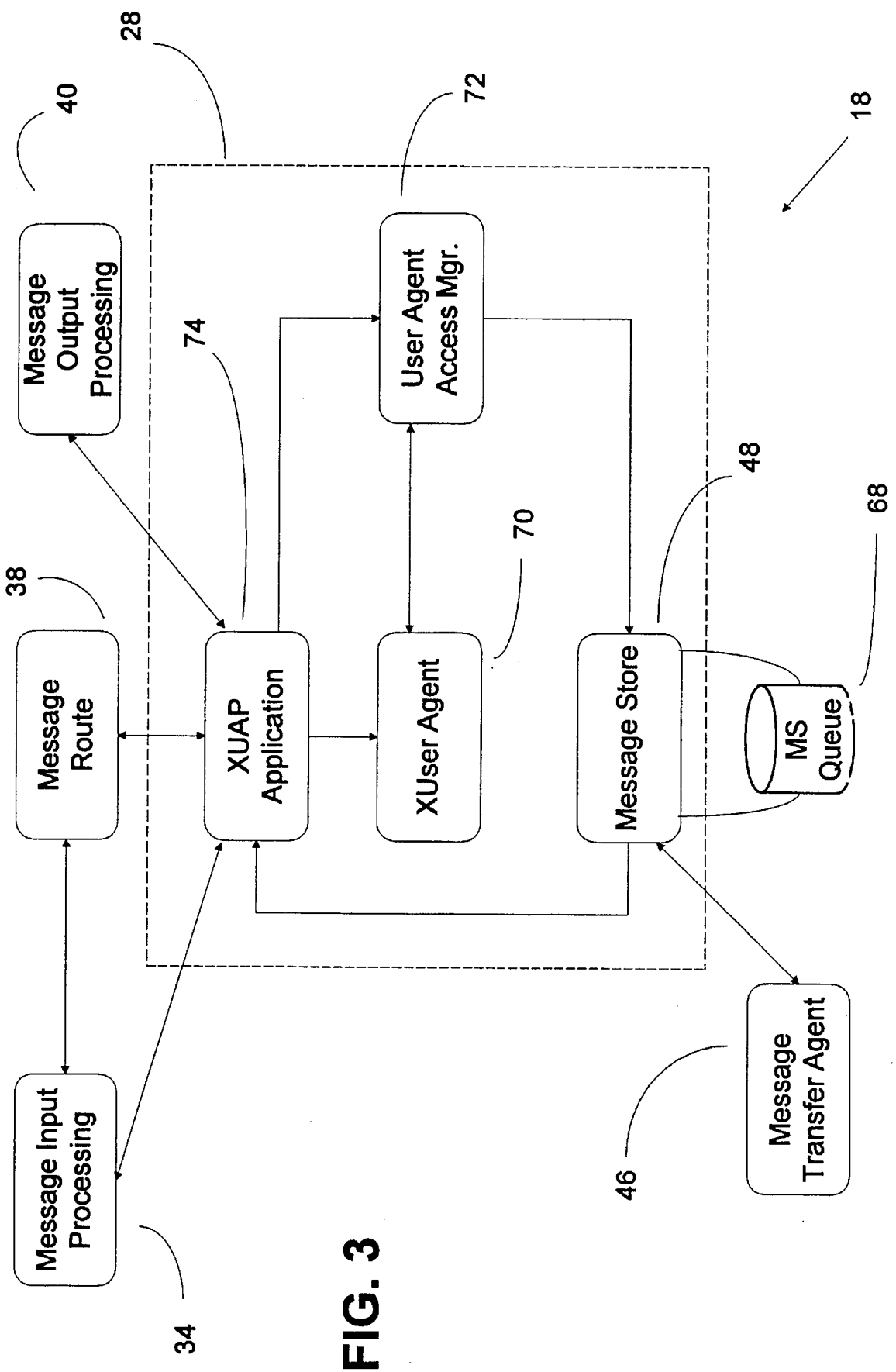
FIG. 3 is a diagram showing additional details of the message routing system shown in FIG. 2.

Referring now to FIG. 3, further details of the automated gateway user agent 28 are shown. As discussed above, the message route module 38 will transfer a message from the AUTODIN network to the AGUA 28 when an X.400 address exists in the message. The AGUA will validate the address and create an X.400 envelope around the entire message and submit it to the X.400 message store 48. Also, the message store 48 is connected to a message queue 68 which holds messages while the message store is processing it.

In more detail, at the center of the AGUA 28 is an X-window user agent module 70. In conventional X.400 systems, user agents (such as agents 50 and 52) are used for manually receiving and transmitting messages. The X-User agent 70 contained in the AGUA 28 likewise can be used in a manual mode at a user's terminal (such as terminal 22 in FIG. 1) to create, transmit or receive messages. In the manual mode, the user agent access manager 72 manages commands coming from the user agent 70. The user agent access manager 72 provides the validation and command parsing between the message store 48 and the XUAP application processor module 74. All command request and command replies are provided by the user agent access manager 72. In the automatic mode, the user agent 70 becomes part of a conduit between the two message handling systems. In the preferred embodiment the user agent 70 runs under X-window. It will be appreciated that X-window is the international standard from Massachusetts Institute of Technology for the presentation of graphical information which permits the presentation of multiple displays on a single screen. Thus, commands entered into the X-User agent terminal are modified to become an X-window motif.

AUTODIN messages transferred to the AGUA 28 are received initially by the X-UAP application module 74. This module performs various X-window motif-type functions including creating messages, submitting messages, and fetching a message and also has editing capabilities. In the automatic mode, the X-UAP application module 74 receives messages from the AUTODIN system and creates an X.400 envelope around the message as discussed above. The message is then transferred to the user agent access manager 72 which determines if the submit request is valid, provides an acknowledgement and places the message in the correct user agent message store 48.

Alternatively, X.400 messages which contain AUTODIN addresses are transmitted from the message store 48 to the X-UAP application module 74 which will put the X.400 message into the AUTODIN format and transmit it to message output processing 40. In more detail, to accomplish this, the XUAP application module 74 receives notification that a message is contained in its message store. The X-UAP process retrieves the message from the message store 48 and passes the message to message route unit 38 which converts the message to the appropriate message format (such as JANAP-28) and submits the message to message output processing 40.

It will be appreciated that the X.400 system is used for more than just data and is a free-form of exchange of data which may include things such as maps, data, voice packets that have been digitized, etc. However, in the preferred embodiment only data messages received from the X.400 system will be transferred into the AUTODIN system because that is the only kind of message that AUTODIN can handle.

Figure 4:
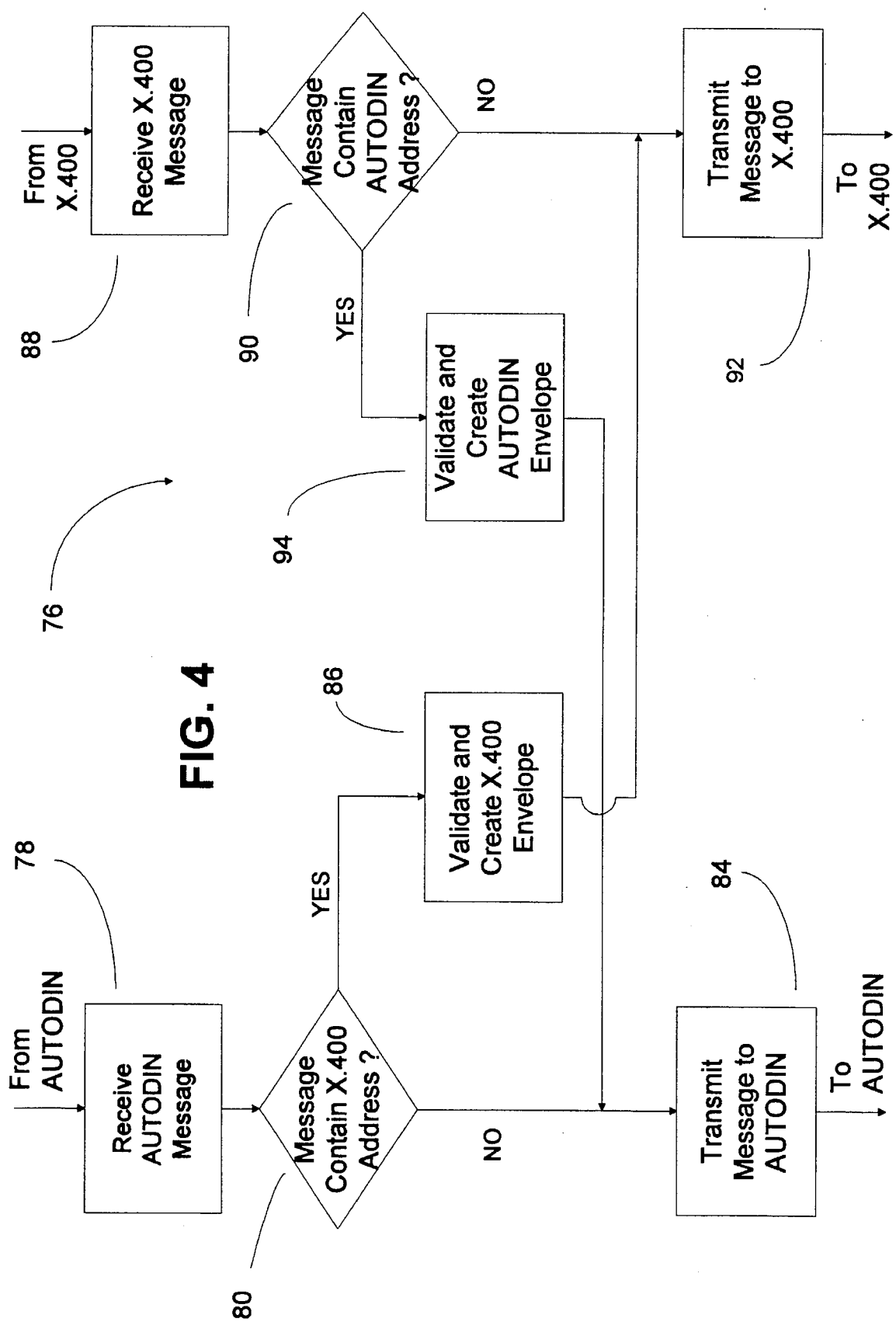
FIG. 4 is a flow chart of the message routing process of the present invention.

Referring now to FIG. 4, a simplified flow chart of the overall message routing method 76 in accordance with the present invention is shown. Messages are received from the AUTODIN system 78, and are analyzed to determine if they contain X.400 addresses 80. If not, the message is sent back to the AUTODIN system as shown by the block numbered 84. If so, the format is validated and an X.400 envelope is created 86 and the message is transmitted to the X.400 system 92. In a similar fashion, messages received by the X.400 system 88 are analyzed to determine if they contain an AUTODIN address 90. If not, they are transmitted to the X.400 system 92. If so, the format is validated and an AUTODIN envelope is created and the message sent to the AUTODIN system 84.

In accordance with a preferred embodiment of the present invention, the following sections will describe a number of features of the message routing system 10. These include user and provider references, registered functions and data structures, and various other functions which are processed by the AGUA 28.

In more detail, these are new functions created to be compatible to the OSI X.400 specifications. That is, these functions provide a buffered interface to any future X.400 systems. As a result the up front man-machine interface will not be lost due to periodic changes in the X.400 standards. These functions are in a sense a universal mating device between the front end code used in the AGUA 28 and the X.400 system. The interface is thereby simplified so if the back-end X.400 standards change, the man-machine interface (MMI) is still protected. This works because, it keeps everything constant (at 1988 back to the 1984 X.400 standards) and any X-Window type man-machine interface will be able to map into this without any knowledge of any changes within the X.400 system. As a result, there will not be a necessity for updating software in response to such changes. The functions described below are all written in the programming language known as "C".

1.1 User and Provider References

An important concept in ISO messages is the idea of user and provider references. These are used to identify particular users to a neighboring layer, without the other layer having to know anything about the users themselves. More simply, they are numbers, passed across layers which identify users and service providers. Usually they occur in pairs. That is, a user and a provider reference are both needed to identify the transition point across layers. The terms user and provider references are relative, as you move down through the layers. A provider reference describes the user to the next lower layer, a user reference is passed to a lower layer, to be returned with incoming data, to allow the user's layer to direct the incoming information to the user. It will be appreciated that in each message transfer agent 54, X.400 messages go through all 7 layers. The bottom layer is the actual physical transfer taking place on the electrical domain.

1.2 Registered Functions

Another method of directing information to users is the use of registered functions. When a particular user first uses the AGUA 28 (also referred to as the user agent portable interface (UA PI)), the user passes in, as parameters, the names of the functions the user wishes to use to output information from the user agent portable interface. When the user agent portable interface wishes 28 to call a function in the X-User agents, it uses one of the values registered with it.

1.3 Data Structures

All of the data structures used with the present invention may be those defined in files contained in the ISO X-88/common/include directory, which is a common file used with X.400 system comprising an explanation of all the possible variables used with the application codes. In particular, definitions which may be used occur in the P2.h, P3.h, P7.h and COMMON.h files. More basic data types, (such as Sint 16, generic PTR and struct any _ type) are found in the ISO include/upper directory. The ISO X-88/common/include directory and the include/upper directory are both hereby incorporated by reference.

2.0 Initialization, Termination and Error Handling

This section describes how the AQUA 28 is initialized and how the XUAs can attempt to establish associations. The functions described use definitions in machdeps.h and sldeps.h. These header files are located in the include/upper directory described above.

2.1 Initialization

| | |
|---|---|
| Sint16 | |
| | ua_init(void) |

This function is used to initialize the AQUA 28. The AQUA should only be called once from the master control program (MCP). The value it will return is UA_ALL_OK (i.e. zero) or a negative number on failure.

2.2 Scheduling the AQUA

| | |
|---|---|
| Sint16 | |
| | ua_schedule(void) |

This function is used to schedule the AQUA. It handles all necessary events and schedules the AQUA to handle incoming events. This should be called periodically (i.e. somewhere between a one and five second interval) from the master control program (MCP). If the function fails, it returns a negative value, otherwise UA_ALL_OK.

2.3 Termination

| | |
|---|---|
| Sint16 | |
| | ua_quit(void) |

Once all associations have been closed, the user can call this function which will free all resources held by the AQUA. If any associations still exist then the ua_quit( ) will return a non-zero error code. This function should only be called from the MCP.

2.4 Errors

| | |
|---|---|
| char * | |
| | ua_last Error(void) |

When a function returns a non-zero value, it is imperative to call ua_lastError( ). This function returns a pointer to a character buffer; containing a textual description of the error encountered. This buffer must be secured by the calling routine before continuing, as it is defined static.

2.5 Errors generated by incoming events

| | |
|---|---|
| void | |
| | UA_error(buffer) |
| char | *buffer: |

This registered function is called whenever an incoming event generates an error. The parameter buffer is a pointer to a character array. This buffer should be secured before UA_error( ) returns. Examples of errors which may generate a call to this function are, failure to retrieve configuration information, a timer expiring or a parse error on an incoming response.

3.0 Association Establishment and Association Closing

These groups of functions are responsible for establishing and maintaining associations. Before any operations can be invoked on the message store 48 an association must be established. Once an association is no longer required, the unbind operation can commence. Binds and unbinds are like any other remote operation invoked on a message store (MS). It is important for the calling software to wait for the response particularly in the unbind operation, before continuing.

3.1 Binding

```
Sint16
    ua_bind(user_ref, name, UA_error, UA_bindCnf,
    UA_bindErr, UA_unbindCNF, UA_abort,
    UA_subRslt, UA_probeRslt, UA_summRslt,
    UA_listRslt, UA_fetchRslt, UA_genRslt,
    UA_absError, UA_reject)
GenericPtr    user_ref;
char *name;
void (*UA_error) ( ),  (*UA_bindCnf) ( ), (*UA_bindErr) ( ),
    (*UA_unbindCnf) ( ), (*UA_abort) ( ), (*UA_subRslt) ( ),
    (*UA_probeRslt) ( ),    (*UA_summRslt) ( ),
    (*UA_listRslt) ( ),
    (*UA_fetchRslt) ( ), (*UA_genRslt) ( ), (*UA_absError) ( ),
    (*UA_reject) ( );
```

This function takes a number of parameters. The first is a user_ref. This value is returned as a parameter in any of the registered function. The next parameter is a character string. It corresponds to the user's login name and is used to retrieve configuration information. Therefore, the name used must have been configured into the Configuration Package's (also known as set up package) files.

The final parameters are the names of the functions contained in the XUA's code which will be used to output the various invoked operations' returned results, errors and rejects.

On successful completion this function returns UA_ALL_OK otherwise non-zero. Calling ua_lastError( ) will give a textual description of the problem.

3.2 Bind Results

```
void
    UA_bindCnf(user_ref, prov_ref, bindRes, ourCreds)
GenericPtr                user_ref:
GenericPtr                prov_ref;
P7MSBindResult            *bindRes;
COMMONCredentials         *ourCreds;
```

This registered function is called by the AQUA when a bind result has been received. The user_ref is the value given to the UA-bind function call. the value prov_ref is used as a parameter to all the remote operation function calls. The bindRes structure is allocated on a $_\chi$M_freeTree finished with it the whole tree should be freed using the $_\chi$M_freeTree function, (see the Upper Layer Common Facilities Manual for details on the $_\chi$M Memory Management Package). The ourCreds structure contains the user's credentials retrieved from the configuration package. These credentials (passwords_ should be checked against the credentials returned from the message store 48 (MS). If these credentials match, the association is said to be established. Otherwise, ua_sendAbort( ) should be called, as the message store 48 (MS) is not said to be "trusted". The credentials structure should not be freed.

3.3 Bind Errors

```
            void
                UA_bindErr(user_ref, error)
            GenericPtr    user_ref:
            Sint16        error;
```

In the event that a message store command rejects an association a bind error is returned. The values that error can take and their meanings can be found in 1988 CCITT Blue Book Vol. 8 Recommendation X.400 thru X.420 at §7.1.3 of Recommendation X.413 which is a publicly available Open Systems Integration (OSI) document. NOTE: All resources in the AQUA will have been released at this point. A user will have to re-bind to the message store (MS), if they wish to continue.

3.4 Unbinding

```
            Sint16
                us_unbind (prov_ref)
            GenericPtr    prov_ref:
```

This function takes as a parameter the provider reference, returned in the Bind Confirm. This function closes an association. The user should wait until the registered function UA_unbindCnf( ) is called before they terminate the session. Once the us_unbind( ) call has been issued, the provider reference is no longer valid, and must NOT be used again. This function should only be called if there are no outstanding operations. If there are outstanding operations the function will return the error UA_OUTSTANDING_OPS. If the function fails a non-zero error code will be returned.

3.5 Unbind Confirms

```
            void
                UA_unbindCnf(user_ref)
            Generic    user_ref;
```

This registered function is called when the association is completely finished. At this point and only at this point, can the user safely terminate. NOTE: Closing an association cannot be rejected and therefore no errors can be generated.

4.0 Abnormal Association Termination—Aborts

An association can terminate abnormally for a number of reasons. If a serious error occurs, then it may be appropriate to terminate the association without regard for any outstanding operations. An abort does this. It can be generated locally, by the UA, or remotely by the Message Store (MS). Once an abort has been issued or received the association no longer exists, and so all the resources allocated to that association are freed. In particular, the provider reference is no longer valid, and no further operations may be invoked on the MS, nor will nay operation' results be received either.

4.1 Issuing Aborts

```
            Sint16
                us_sendAbort(prov_ref)
            GenericPtr    prov_ref;
```

When the user wishes to terminate an association and does not care about any outstanding operations, they may have, they call us_sendAbort( ). Once this is done all resources allocated to the association are freed and the prov_ref is also no longer valid. The abort service is an unconfirmed event. This function returns a non-zero value in the event of failure.

4.2 Incoming Aborts

```
            void
                UA_abort(user_ref)
            GenericPtr    user_ref;
```

This function is called whenever the AQUA receives (or generates itself) an abort. Once this function is called the association is terminated and no further operations may be invoked on the association. Likewise, no operations' results will be returned to the $_x$UA.

5.0 Message Submission Service Element (MSSE) Operations

MSSE operations relate to those operations which submit messages or probes to the message transfer system (MTS). A probe is a type of message which is submitted to the MTS. The MTS will attempt to deliver the message, as far as the user's message transfer agent (MTA). If it can get as far as this, then a delivery report may be returned to the user. If it cannot deliver the message, a non-delivery report is generated and returned to the user. In the preferred embodiment, no message is actually delivered, just the possibility of a message being delivered is checked.

5.1 Message Submission

```
Sint16
        us_submit(prov_ref, op_ref, envelope, p2content)
GenericPtr                    prov_ref;
GenericPtr                    op_ref;
P3MsgSubmissArg               *envelope;
P2InfoObject                  *p2content;
```

The prov_ref is a value which uniquely identifies the association from the point of view of the AQUA. The op)ref is a reference for the invoked operation. Any result, error or reject generated by this invoked operation will have the operation reference returned with it, as a parameter of the registered function. This will allow the XUA to easily track outstanding operations' responses. The envelope and content are filled out by XUA. The XUA is responsible for freeing any memory allocated to these structures. This function returns UA_ALL_OK on success and a non-zero value on failure.

5.1.1. Originator Name

```
Sint16
        us_getOriginator(prov_ref, oRName, tree)
GenericPtr                    prov_ref;
COMMONORNname                 **oRName:
XM_Tree                       *tree;
```

One of the fields of the message or probe submission envelope is the originator ORName. This is used to verify that the user is actually who they claim they are. This should be machine generated rather than user input. Calling this function with the address of a pointer to a COMMONOR-Name and the provider reference will result in the user's ORName being filled out and returned. The XM_Tree is used to copy the memory to a suitable location where it can be freed off, later.

5.2 Message Results

```
void
        UA_subRslt(user_ref, op_ref, subRslt)
GenericPtr                    user_ref;
GerericPtr                    op_ref;
COMMONMsgSubmissResult        *subRslt;
```

This function is called to indicate to the user that a previously submitted message, has been successfully sent to the message transfer system (MTS). The user_ref is the value passed into the bind operation's function. The op_ref is a value passed into the original ua_submit( ) function. These values will identify the user and also the user's message or operation. The final value is the actual message submission result. This contains some information which would be needed by the user if they wished to cancel a message with deferred delivery. (See ua_cancel( ) below.) The memory allocated by the AQUA for the submission result should be freed by getting the parent of it, and freeing that tree, i.e.

```
xm_freeTree (xm_getParentOfItem ((GenericPtr )subRslt));
```

5.3 Probe Submission

```
Sint16
        ua_probe(prov_ref, op_ref, envelope)
GenericPtr                    prov_ref;
GenericPtr                    op_ref;
P3ProbeSubmissArg             *probe;
```

This function submits a probe to the message transfer System (MTS). Note that no P2 Content is passed to the function. Instead a length is part of the probe envelope. This length should be calculated, (or at least guessed!). The length of a P2InfoObject can be calculated using ua_getContentLen( ). The XUA has the responsibility for freeing the probe's memory. This function returns non-zero on failure.

5.3.1. Calculating Content Length

```
Sint32
        ua_getContentLen(p2Content)
P2InfoObject          *p2Content;
```

This function takes a P2InfoObject structure and returns the length of the corresponding formatted buffer. If for any reason the function fails, the return value is negative.

5.4 Probe Results

```
void
        UA_probeRslt(user_ref, op_ref, probeRslt)
GenericPtr            user_ref;
GenericPtr            op_ref;
COMMONProbeSubmissResult *probeRslt;
```

This registered function is called when confirmation that a previously submitted probe is returned from the MTS. The user_ref is the value used to identify the association for the AQUA. the op_ref identifies the probe this result is referring to. The probeRslt structure contains the information returned by the MTS, to identify the probe. The XUA should free the memory allocated to the probe result when it is finished with it.

5.5 Cancel Deferred Delivery

```
Sint16
        ua_cancel(prov_ref, op_ref, msgId)
GenericPtr                    prov_ref;
GenericPtr                    op_ref;
COMMONMTSId                   *msgId;
```

This function is called when a user wishes to cancel a previously submitted message whose delivery had been deferred until after a certain time. The parameters consist of the usual prov_ref, to uniquely identify the association in the AQUA, the op_ref to later match up the response with this invoked operation, and a msgId. The msgId is obtained from the submission result, returned to the XUA, (see above). The XUA has the responsibility for freeing the message identifier. The function returns a non-zero value on failure.

5.6 Cancel Deferred Delivery Result

```
void
        UA_genRslt(user_ref, op_ref)
GenericPtr       user_ref;
GenericPtr       op_ref;
```

This registered function is called on the successful completion of a deferred delivery cancellation. Some operations in X.400 have no actual result associated with them. Instead these functions just return signaling success. The cancel deferred delivery operation is one of these operations. The user and operation reference are passed in as usual. No other parameters are needed.

6.0 Message Retrieval Service Element (MRSE) Operations

The class of operations described by MRSE are probably the most complicated of all X.400 operations. They include list, fetch, message store (MS)-register, summary and delete. These operations are invoked on a message store (MS). The message store (MS) returns responses to these invoked operations. Abstract errors can also be generated by these operations. How to handle abstract errors (i.e. those generated by the message transfer system (MTS)) is discussed in the next section.

6.1 The Summarize Operation

```
Sint16
        ua_summary(prov_ref, op_ref, summary)
GenericPtr       prov_ref;
GenericPtr       op_ref;
P7SummarizeArg *summary;
```

The provider reference and operation reference are passed in as usual. The P7SummarizeArg will have been filled out by the XUA. The XUA will have responsibility for releasing the memory allocated for the summarize argument once this function returns. Not all attributes are available for the summarize operation. A table of message store (MS) attributes which indicates if they are available for the summary operation is given in §11 of Recommendation X.413 of the CCITT Blue Book Vol. 8. The list of Retix supported attributes can be found in an appendix to the Retix 1988 X.400 user guide available from Retix Corp. of Santa Monica, Calif. This function returns UA_ALL_OK on success and a non-zero value in the case of failure.

6.2 Summary Results

```
void
        UA_summRslt(user_ref, op_ref, summRslt)
GenericPtr       user_ref:
GenericPtr       op_ref:
P7SummarizeResult *summRslt:
```

This registered function is called by the UA_PI, to pass to the XUA the results of a previously invoked summarize operation. The user reference and operation value are returned as per usual. The summary result's memory has been allocated on a XM_Tree and should be freed by the XUA.

6.3 The List Operation

```
void
        UA_listRslt(user_ref, op_ref, listRslt)
GenericPtr       user_ref;
Generic Ptr      op_ref;
P7ListResult     *listRslt;
```

This registered function is called by the UA-PI, to pass results of a previously invoked list operation on the MS. The parameters user reference and operation reference are passed in as usual. The list result is allocated on an XM_Tree and should be freed once the XUA is finished using it.

6.5 The Fetch Operation

```
Sint16
        ua_fetch(prov_ref, op_ref, fetchArg)
GenericPtr       prov_ref;
GenericPtr       op_ref;
P7FetchArgument  *fetchArg:
```

This function is called by the XUA when it wishes to invoke a fetch on the MS. As usual the provider and operation references are passed in as parameters. The XUA has to fill out the Fetch argument and ensure that the memory allocated to it is freed after use. A table of attributes is given in §11 of Recommendation X.413. All attributes are available for the fetch operation. The list of Retix supported attributes can be found in an appendix to the Retix 1988X.400 User Guide. This function returns a non-zero error diagnostic on failure.

6.6 Fetch Results

```
void
        UA_fetchRslt(user_ref, op_ref, fetchRslt)
GenericPtr       user_ref;
GenericPtr       op_ref;
P7FetchResult    *fetchRslt;
```

This registered function is called whenever the UA-PI receives the result of an invoked fetch operation. As usual the user and operation reference are passed back up to the XUA. Also passed up is the fetch result structure itself. This is allocated on an XM_Tree and it is the responsibility of the XUA to free it after it has finished securing it.

6.7 The Delete Operation

```
Sint16
        ua_delete(prov_ref, op_ref, deleteArg)
GenericPtr       prov_ref;
GenericPtr       op_ref;
P7DeleteArg      *deleteArg;
```

This function takes, like the other invoked operation functions, a provider and operation reference. It also takes a delete argument. This argument's memory must be freed by the calling XUA when this function returns. This function returns UA_ALL_OK on success and a non-zero code on failure.

6.8 Delete Results

```
void
        UA_genRslt(user_ref, op_ref)
GenericPtr       user_ref;
GenericPtr       op_ref;
```

The delete operation has a NULL result. It only returns success or failure. A full description of this function can be found in the section covering cancel deferred delivery.

6.9 The Register MS Operation

```
Sint16
    ua_regMS(prov_ref, op_ref, regMS)
GenericPtr              prov_ref;
GenericPtr              op_ref;
P7RegisterMSArg         *regMS;
```

This function is called by the XUA when it wishes to invoke a RegisterMS operation on the MS> The only operations supported at the present by Retix are, registering list default attributes, registering fetch default attributes and changing credentials. Only simple text credentials are supported at the present.

The XUA is responsible for freeing any memory allocated to the register argument. This function returns a non-zero error code on failure.

6.10 RegisterMS Results

```
void
    UA_genRslt(user_ref, op_ref)
GenericPtr       user_ref:
GenericPtr       op_ref;
```

The Message Store Register operation has a NULL result. It only returns success or failure. A full description of this function can be found in the section covering cancel deferred delivery.

7.0 Handling Abstract Errors

Abstract errors are those errors generated by the MTS and transmitted to the User Agent. Some of these errors are complicated to output, but they are all defined in the standards and header files.

7.1 Abstract Errors

```
void
    UA_absError(user_ref, op_ref, class, ptr)
GenericPtr       user_ref;
GenericPtr       op_ref;
Sint16           class;
GenericPtr       ptr;
```

This registered function is called by the UA-PI when an abstract error has been received from the MTS. The usual registered function parameters of user and operation reference are passed in. Passed in also is a class variable. This indicates the class or type of error that is being reported. The last parameter, ptr, is used by some classes of error. The information passed over on this pointer should be secured before the function returns; as after that the information is no longer valid.

In all there are eighteen abstract errors defined in X.400 that relate to user agents. They fall into two different types, MRSE and MSSE abstract errors.

7.1.1. Message Submission Service Element (MSSE) Abstract Errors

The following ten errors shown in FIG. 5 mainly have to do with submitted messages. The errors are usually generated by message transfer agent (MTA) in the system. The table that follows displays the hash defined value of the error class, and what type of structure ptr points to, if any. It also gives a brief description of what the error means but a fuller description can be found in §8.2.2 of Recommendation X.411 of the 1988 CCITT Blue Book Vol. 8.

7.1.2. Message Retrieval Service Element (MRSE) Abstract Errors

The table in FIG. 6 describes the errors associated with MRSE operations. These errors are generated by the MS and are more common than the MSSE errors. The table again consists of the hash defined values, the type of structure that ptr point to, if any, and a brief description of the abstract error. A fuller description can be found in §9 of Recommendation X.413. The hash defined values themselves can be found in utility/include/objid.h.

8.0 Attribute Support

Entries are stored in a Message Store 48 as a series of Attributes. Attributes themselves consist of Attribute Types and Attribute Values. To examine an attribute's value it is necessary to know its syntax. The syntax is described by the attribute type. This can at times be fairly complex and Retix have implemented a number of utilities which attempt to make the user's job easier. To add to this, the AQUA will have a function which will take some parameters, and return some values which will allow for very easy output of the attribute values.

8.1 Attribute Support Functions

```
Sint16
    ua_attribSupport(type, value, tree, class, ptr)
P7AttrType              *type
struct any_type         *value;
XM_Tree                 *tree;
Sint16                  *class;
GenericPtr              *ptr;
```

This function takes a number of parameters. the first is the attribute type. This is returned with any fetch, list, or summary result from the MS. The any_type value is also returned with the result. The value of tree should be the parent of the fetch, summary or list result that was passed in to the appropriate registered function from the UA-PI. This can be obtained from a function call such as:

tree=xm_getParentOfItem((TenericPtr)result);

The ua_attribSupport( ) function will move any memory it allocates to this tree, allowing the user to free all memory with one simple call to the xm_freeTree( ) function. For more information, refer to the Upper Layer Common Facilities Manual.

The last two parameters are used to pass values back out of the function. On entry class must be the valid address of a Sint16 and ptr must be the valid address of a GenericPtr. On exit, if the function returns non-zero, they will point to a C structure and a class defining what is the C structure and what was the attribute type, too.

The table in FIG. 7 lists the currently supported attributes in the Retix product. A full list and description of the MS attributes can be found in §11 of Recommendation X.413. The table below outlines the values for class and the typedefs of the C structures ptr points to. The hash defined values can be found in utility/include/objid.h. This function returns UA_ALL_OK on success and non-zero on failure. The contents have a "nested" encoding. Body Parts are encoded. See the next section on how to deal with them.

8.2 Body Part Support Functions

```
Sint16
    ua_handleBPs(bodyElem, file, type)
P2Body_Element   *bodyElem;
char             *file;
Uint16           *type;
```

This function is designed to help the XUA output body parts. The XUA should call this function for each BodyPart it receives in an incoming Fetch Result. (Only fetches retrieve Message Contents.) The first parameter is a P2Body_Element. This is obtained from the P2 Interpersonal message (IPM). The next parameter is the file into which the XUA wishes to place the information contained in the Body Part. The AQUA must be able to write to this file and it will truncate it to zero on opening. The final parameter is an output parameter. On entry it must be the valid address of a Uint16 variable, on exit it will have a value indicating what type of Body Part was output into the file. At present the supported Body Parts and their associated values are as shown in FIG. 8.

9.0 Handling Rejects

Rejects occur when a peer entity is unable to handle what has been sent to it. It indicates a serious problem but one that does not warrant the association to be aborted. An example might be failing to parse an incoming PDU (Protocol Data unit). The Remote Operation Service Element (ROSE) generates rejects and they are defined in Recommendations X.219, and X.229. A reject can be one of four types, General, Invoke, Returned Result and Returned Error rejects. Each of these refer to the different types of operations that were occurring when the reject was detected and transmitted. Rejects are quite rare in X.400 and although they appear complicated, they should not be an over-riding concern in development.

9.1 ROSE Rejects

```
void
    UA_reject(user_ref, op_ref, type, problem)
GenericPtr                user_ref;
GenericPtr                op_ref;
Uint16                    type;
Sint16                    problem;
```

Referring now to FIGS. 9–12, this registered function takes a number of parameters. The user and operation reference are passed in as normal. The last two parameters are the type and problem parameters. These specify the value of the reject and what sort of reject it was. the type can have one of four values; (All of these values can be found in common/include/XRO.h.)

From the foregoing it can be seen that the present invention provides a means for interfacing an informal message transfer system, message handling systems such as the X.400 with a formal system such as the Department of Defense AUTODIN System. Those skilled in the art can appreciate that other advantages can be obtained from the use of this invention and that modification may be made without departing from the true spirit of the invention after studying the specification, drawings and following claims.

What is claimed:

1. A message handling system comprising:

a first preexisting message handling system including a plurality of user addresses connected to a first communication pathway;

a second preexisting message handling system including a plurality of user addresses connected to a second communication pathway wherein said first message handling system requires messages to contain specified message handling attribute information, such that messages from the second message handling system are incompatible with the first message handling system; and automated gateway means for providing an interface between the first and second message handling systems, said gateway means being coupled to said first and second communication pathways means and including:

message routing means for receiving messages from one of said plurality of user addresses in said first and second message handling systems, said routing means including means for storing a table of said user addresses existing in the first message handling system;

means for determining if the text of said message received from one of said plurality of user addresses in said second message handling system contains one of said first message handling system addresses in said table;

means for creating a first message handling system envelope and adding it to said second message handling system message if it contains a first message handling system address, wherein said envelope contains said first message handling system message handling attribute information thereby making the second message handling system message compatible with the first message handling system while leaving the format of the text of said second message handling system message substantially unaltered, said first message handling system envelope being incompatible with said second message handling system;

means for transferring said second message handling system message containing said envelope to one of said plurality of user addresses in said first message handling system; and means for transmitting said received second message handling system messages containing only second message handling system addresses back to said second message handling system communication pathway unchanged without said envelope.

2. The automated gateway of claim 1 further comprising a message transfer agent for determining if a message received from said first message handling system contains only addresses in said first message handling system, said message transfer agent including means for directing said message containing only addresses in said first message handling system back to said first message handling system, and means for directing a message received by said message transfer agent containing an address in said second message handling system to said second message handling system.

3. The automated gateway of claim 1 wherein said first message handling system is a formal message handling system and said second message handling system is an informal message handling system.

4. The automated gateway of claim 1 further comprising a user agent means usable in either a manual or automatic mode.

5. The automated gateway of claim 3 wherein said first message handling system is the Department of Defense AUTODIN network and the second message handling system is the International Standards Organization X.400 message handling system.

6. The automated gateway of claim 5 wherein said first message handling system message comprises at least one of ACP-127, JANAP-128 or DOI-103 message types.

7. The automated gateway of claim 5 further comprising message input processing means for providing security validation, message routing and logging functions.

8. The message routing system of claim 7 wherein said means for converting the format further comprises means for creating an envelope around said second type message which complies with said format requirements of the first message handling system.

9. The automated gateway of claim 7 wherein said message input processing means unit replicates messages containing both AUTODIN and X.400 message addresses and transfers multiple versions of said message to the message routing means.

10. A communication system comprising:

a first preexisting message handling system operative on messages on a first communication pathway, said messages conforming to a first message handling format and said first message handling system having first system addresses;

a second preexisting message handling system having second system addresses operative on messages on a second communication pathway, said messages conforming to a second message handling system format wherein messages from the second message handling system are incompatible with the first message handling system;

message routing means coupled to said first and second communication pathways for receiving messages from said first and second message handling systems and determining if a message received from said second message handling system should be sent to said first or to said second message handling system, said routing means including means for storing a table of addresses existing in the first message handling system;

means for determining if the text of said message received from said second message handling system contains one of said first message handling system addresses;

means for creating a first message handling system envelope and adding it to said message received from said second message handling system if it contains a first message handling system address, said envelope conforming to said first message handling format thereby making the second message handling system message compatible with the first message handling system while leaving the format of the text of said second message handling system message substantially unaltered; and means for transferring said second message handling system message with said envelope to said first message handling system, wherein messages are transferred from said second message handling system to said first message handling system.

11. The communication system of claim 10 wherein said message routing means further includes means for routing said message to said second message handling system if said received message does not contain a first message handling system address.

12. The communication system of claim 10 further comprising a message transfer agent for determining if a message received from said first message handling system contains only addresses in said first message handling system, said message transfer agent including means for directing said message containing only addresses in said first message handling system back to said first message handling system, and means for directing a message received by said message transfer agent containing an address in said second message handling system to said second message handling system.

13. The communication system of claim 10 wherein said first message handling system is a formal message handling system and said second message handling system is an informal message handling system.

14. The communication system of claim 10 further comprising a user agent means usable in either an automatic or manual mode.

15. The communication system of claim 13 wherein said first message handling system is the United States Department of Defense AUTODIN network and the second message handling system is the International Standards Organization X.400 message handling system.

16. A method for interfacing a first message handling system having addresses on a first communication pathway with a second message handling system having addresses on a second communication pathway wherein said first message handling system requires messages to contain a specified first message handling system format incompatible with said second message handling system, said method comprising the steps of:

comparing the text of a message received from the second message handling system data pathway to a table of addresses in said first message handling system;

creating an envelope around said second message handling system message if it contains a first message handling system address, said envelope contains said first message handling system format and said envelope being incompatible with said second message handling system thereby making said second message handling system message compatible with the first message handling system while leaving the format of the text of said second message handling system message substantially unaltered;

transferring said second message handling system message with said envelope to said first message handling system; and transferring second message handling messages containing only second message handling system addresses back to said second message handling system unchanged without said envelope.

17. The method of claim 16 further including the step of routing said second message handling system message back to said second message handling system if said received message does not contain a first message handling system address.

18. The method of claim 16 further comprising the steps of:

determining if a message received from said first message handling system contains only addresses in said first message handling system and if so directing said message back to said first message handling system; and directing messages from said second message handling system containing only an address in said second message handling system back to said second message handling system.

19. The method of claim 16 wherein said second message handling system has a second system format and further comprising the step of determining if a message received from said first message handling system contains an address in said second message handling system and, if so, converting said message to said second message handling system format and transmitting said message to said second message handling system.

20. The method of claim 16 wherein said first message handling system requires messages to contain specific message attribute information and said step of creating an envelope around said second message handling system message further comprises the step of creating an envelope containing said specified message attribute information.

21. A method for interfacing a first formal message handling system having addresses on a first communication pathway with a second informal message handling system having addresses in a second communication pathway wherein said first message handling system requires messages to contain specified message handling attribute information not contained in said second message handling system messages, said message handling attribute information including data indicative of said addresses on said first communication pathway, said method comprising the steps of:

comparing the text of a message received from the second message handling system data pathway, to a table of addresses in said first message handling system;

creating an envelope and adding it to said second message handling system message if it contains a first message handling system address, said envelope containing said first system handling attribute information and said envelope being incompatible with said second message handling system thereby making said second message handling system message compatible with the first message handling system while leaving the format of the text of said second message handling system message substantially unaltered, wherein said first message handling system address is an ultimate recipient of said second message handling system message, wherein said second message handling system address is an original sender of said second message handling system message;

transferring said envelope with said second message handling system message to said first message handling system; and routing said second message back to said second message handling system data pathway if said received message does not contain a first message handling system address.

22. The method of claim 21 further comprising the steps of:

determining if a message received from said first message handling system contains only addresses in said first message handling system and if so directing said message back to said first message handling system.

23. The method of claim 21 wherein said second message handling system has a second system format and further comprising the step of determining if a message received from said first message handling system contains an address in said second message handling system and if so, converting said message to said second message handling system format and transmitting said message to said second message handling system.

24. A message routing system comprising:

first message handling system including first data pathway carrying messages of a first type;

second message handling system including a second data pathway carrying messages of a second type, said first message handling system having message handling system format requirements which are incompatible with said messages of a second type said message handling system format requirements including data indicative of destinations on said first data pathway;

input/output means for receiving and transmitting said message to and from each of said first and second message handling system data pathways;

means for determining from their text the type and destination of said messages received by said input/output means;

means for determining if a received message of a second type contains a destination in said first message handling system;

means for converting the message handling system format of said second type message containing a destination in said first message handling system so it will be compatible with said first message handling system while leaving the format of the text of said second type message substantially unaltered, wherein said destination is an ultimate recipient of said second type message, wherein said second message handling system includes an original sender of said second type message;

means for transmitting said converted message to said first message handling system data pathway; and means for transmitting received first and second message handling systems messages unchanged back to the first or second message handling systems data pathway if they only contain destinations in the same respective message handling system.

25. The message routing system of claim 24 wherein some of the messages contain plain language addresses in their text and said means for determining the type and destination of said messages reads said plain language addresses.

* * * * *